April 14, 1959  G. H. POTH  2,881,696

FRUIT SLICE JUICE EXTRACTOR

Filed Nov. 7, 1956

INVENTOR
GEORGE HENRY POTH

BY  W. E. Sherwood

ATTORNEY

# United States Patent Office 2,881,696
Patented Apr. 14, 1959

2,881,696
FRUIT SLICE JUICE EXTRACTOR
George Henry Poth, Louisville, Ky.

Application November 7, 1956, Serial No. 620,840

3 Claims. (Cl. 100—234)

This invention relates to an improved device for extracting juice from slices of fruit and, more particularly, to a compact, easily handled article suitable for table use.

Various articles of this general type have been proposed heretofore, but so far as I am aware, all such prior articles have possessed one or more disadvantages which it is a purpose of my invention to overcome.

An object of the invention is to provide a compact juice extractor having relatively small overall dimensions permitting the extractor to be conveniently carried on a small plate together with slices of fruit.

Another object is to provide an improved juice extractor which can be employed with one hand.

Another object is to provide an improved juice extractor into which the slice of fruit may be shovelled without requiring the hand to touch the fruit.

A further object is to provide an improved juice extractor having interleaved pressure plates pivoted upon a relatively large hinge pin.

Still another object is to provide an improved juice extractor permitting distribution of extracted juice while minimizing the side-wise spray of such juice.

Other objects and advantages will become apparent as the description proceeds and when considered in conjunction with the accompanying drawings in which a presently preferred form of juice extractor is shown.

In the drawings Fig. 1 is a plan view of the assembled extractor in closed position;

The invention comprises in general a juice extractor formed of two members each having a recessed pressure plate with a handle portion formed at one end, and pivotally mounted in interleaved arrangement to permit a conventional scissors-like leverage action. Means are provided to hold the plates normally separated and each pressure plate, along with its handle portion, preferably is formed integrally of the same material, such as by a die casting or molding operation. The material used may be metal or a conventional plastic, although I prefer to employ the latter.

Figure 1:
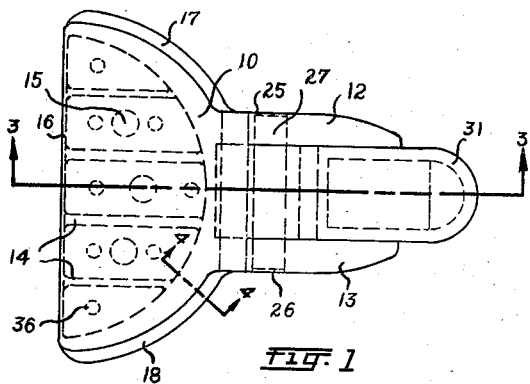
Figure 2:
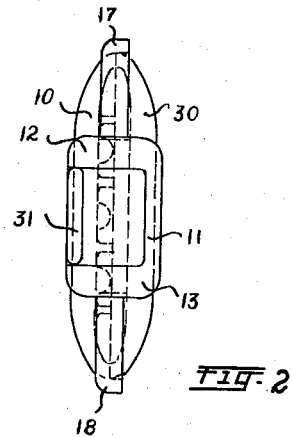
Fig. 2 is an end view of the extractor of Fig. 1.
Figure 6:
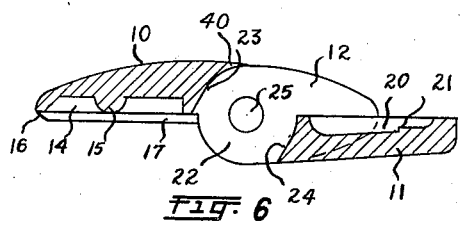
Fig. 6 is a longitudinal sectional view of the detached upper pressure plate.

Referring first to Fig. 2, the upper member of the extractor includes a pressure plate 10, a handle portion 11 offset from the plate 10 and two spaced side walls 12 and 13 joining the plate and handle into a single member. As best seen in Fig. 6, the plate 10 is provided with a recess on its lower surface, which recess tapers from a shallow dimension adjacent the forward end or lip of the plate to a deeper dimension adjacent the rear of the plate for a purpose later to become apparent. Within the recess, a series of longitudinally extending ribs 14 having projections 15 interspersed between the ribs, is provided for the purpose of expediting the extraction of juice and for permitting the ready removal of fruit residue after the extraction, as by simply shaking the extractor with its plates held in normally open position.

Plate 10 has the general plan configuration of a semi-circular disc whose diameter lies along a narrow ledge 16 defining the forward end or lip of the recess and with the remainder of the ledge forming a boundary for the rind portion of a conventionally cut segmental slice of fruit, such as a slice of lemon, orange, or the like.

Figure 4:
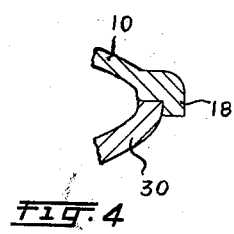
Fig. 4 is a detail sectional view taken on line 4—4 of Fig. 1.

For the purpose of minimizing, if not entirely preventing, sidewise spray of extracted juice, plate 10 may be provided with depending skirt-like shield portions 17 and 18 overlying the edge of its companion pressure plate, as noted in Fig. 4.

Handle 11 is formed with a recess 20 for receiving a flat spring member and has an interior ledge 21 for abutment of the spring edge thereagainst. Between the pressure plate 10 and handle 11 the member is formed with an aperture 22 lying between the spaced side walls 12 and 13. This aperture has two spaced arcuate peripheral surfaces 23 and 24 (Fig. 6) against which a cylindrical hub of the companion extractor member is adapted to move. The aperture 22 is formed with a lower opening equal at least to the diameter of that cylindrical hub in order to permit ready assembly of the extractor members. The side walls 12 and 13 are provided with holes 25 and 26, respectively, to accommodate a pivot pin 27.

Figure 3:
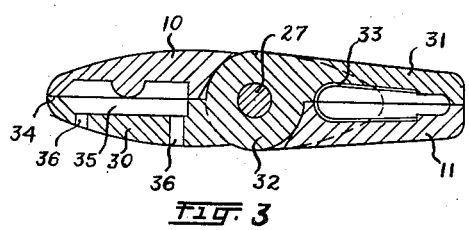
Fig. 3 is a sectional view taken on line 3—3 of Fig. 1.

Considering now Fig. 3, a lower member of the extractor includes a pressure plate 30, a narrow handle portion 31 offset from the pressure plate and a centrally disposed generally cylindrical hub portion 32 joining the plate and handle. An axial hole is formed in the hub portion to accommodate pivot pin 27. The handle portion has a recess corresponding to the recess 20 in handle 11 and with a ledge corresponding to the ledge 21. Within these recesses a flat spring, or other suitable resilient means 33 is disposed. This spring preferably is of stainless steel, or equivalent material immune to acid, and has a tension sufficient to hold the pressure plates in separated condition, but not requiring uncomfortable exertion by the user when employing the extractor. The pressure plate 30 is of a generally semi-circular discal form with a diameter lying along a narrow ledge 34 for engagement with the ledge 16 of the companion pressure plate. The ledge 34 defines the forward end or lip of an open recess 35 whose deepest portion is adjacent the cylindrical hub portion of the plate. A plurality of spaced holes 36 are formed in the plate 30 communicating with that recess and through which extracted juice may drop with substantially uniform distribution from the extractor assembly.

Figure 5:
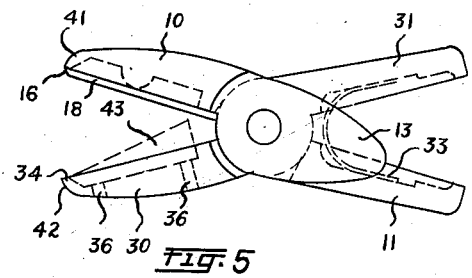
Fig. 5 is a side elevation view showing the extractor in opened position for shovelling the fruit slice thereinto.

Both the upper and lower members may be molded or die cast by presently known techniques and formed from relatively inexpensive materials. For example, they may be molded of a colored plastic material which possesses the advantages of light weight, immunity to acid, and strength, as well as providing an attractive addition to table usage. In assembling the extractor, the handle 31 of the lower member is passed through aperture 22 in the upper member until the hub 32 seats upon surfaces 23 and 24. Pin 27, which may be of stainless steel, is driven through each of holes 25, 26 and the hole in the hub portion. Spring 33 is then inserted and seated within the handle recesses. When so assembled, the spring normally holds the pressure plates in open position, as seen in Fig. 5. The upper surface of narrow handle 31, bearing against the edge 40 of the upper pressure plate 10 (Fig. 6), limits the extent to which the plates are separated.

As a significant feature of my invention, I form the upper and lower discal pressure plates with thin lip sections, 41 and 42 (Fig. 5) having curved outer surfaces adjacent the respective ridges 16 and 34. Accordingly, the user, while holding the handles 11 and 31 between the thumb and fingers of one hand, can easily shovel the fruit slice 43 into the open recess 35 by engaging the lip 42 under the thickest rind portion of the slice and pushing the lower pressure plate forwardly under that slice. No separate loading of the fruit slice into the extractor by touching with the hand is required, as is the case with many prior devices. Bringing the handles 11 and 31 together against the action of spring 33 thereafter causes the juice to be extracted and to drop from the device through holes 36. During this extraction, the shields 17 and 18 prevent sidewise squirting of the extracted juice from the device while, at the same time, the juxtaposed recesses in the plates confine the fruit slice and prevent it from slipping out of place.

It will be seen that, as the pressure plates move toward each other, the projections 15 and ribs 14 press into the cells of the fruit material to enhance the juice extracting action. Following the extraction, these elements frequently remain embedded in the fruit residue and serve to lift that residue from contact with the bottom of recess 35 as the spring retracts the pressure plates. It, therefore, is a simple matter to dislodge the residue from the extractor by simply shaking the device and without touching the residue with the hand.

By the interleaving of the pressure plates, I am enabled to produce a compactly arranged structure having excellent mechanical leverage. The pivot pin 27, of relatively large size, affords an extended bearing surface about which the hub 32 is pivoted. Preferably, the pin fits into holes 25 and 26 with a press fit but into the hole of the hub with a turning fit. The hub 32, walls 12 and 13, and rearward portions of the pressure plates are provided with substantial sections of material, thus permitting them to withstand substantial leverage forces. Endwise slippage of the hub is prevented by the spaced walls 12 and 13 and the spring 33 accordingly may be of a simple construction which is not subject to endwise slippage. The structure can be readily cleaned following usage.

While I have shown a particular embodiment of the invention it will be understood of course, that I do not wish to be limited thereto, since many modifications can be made; and I therefore contemplate by the appended claims to cover any such modifications as fall within the true spirit and scope of my invention.

What I claim as new and desire to secure by Letters Patent of the United States is:

1. In a fruit juice extractor, a first member having a pressure plate at a first end and a handle at a second end and an integral juice shield section depending from the lateral sides of the aforesaid pressure plate, spaced wall portions joining said pressure plate and handle, said first member having an aperture defined respectively by the inner surfaces of said wall portions and by arcuate bearing surfaces on said plate and handle, a second member having a second pressure plate at a first end and a second handle at a second end, said second pressure plate having apertures therethrough and lateral side edges adapted to engage within said depending shield portion, said second member having a generally cylindrical hub portion joining said second pressure plate and said second handle, said hub portion being adapted to seat rotatably upon said arcuate bearing surfaces and to contact at its ends the spaced wall portions of said first member thereby to prevent endwise slippage of said second member and to insure register of said first and second pressure plates as they are moved toward each other, means for pivotally securing said hub portion in said first-mentioned aperture and resilient means interposed between said handles and holding said plates normally in separated position.

2. An extractor as defined in claim 1 wherein said pressure plates are of generally semi-circular discal form terminating in a generally straight lip portion at the edge of the plate farthest removed from the axis of said hub portion whereby said extractor may be employed to shovel a slice of fruit thereinto without touching the fruit slice with the hands.

3. An extractor as defined in claim 2 wherein at least one of said pressure plates contains a projection adapted to squeeze into said slice of fruit and normally to embed itself in said slice whereby upon opening of said extractor the residue of said slice may be shaken from the extractor without touching said residue with the hands.

References Cited in the file of this patent

UNITED STATES PATENTS

| Number | Name | Date |
|---|---|---|
| 26,879 | Bixler | Jan. 24, 1860 |
| 61,251 | Reece et al. | Jan. 15, 1867 |
| 461,393 | Ries | Oct. 13, 1891 |
| 796,543 | Viser | Aug. 8, 1905 |
| 1,098,288 | Mosteller | May 26, 1914 |
| 1,530,586 | Wack | May 24, 1925 |
| 1,840,044 | Mattes | Jan. 5, 1932 |
| 1,875,678 | Thate | Sept. 6, 1932 |
| 1,910,750 | Clark | May 23, 1933 |
| 2,735,360 | Battke | Feb. 21, 1956 |